June 1, 1937. C. G. SEYFERTH ET AL 2,082,033

LANDING GEAR

Filed May 21, 1934 2 Sheets-Sheet 1

Inventors
Carl G. Seyferth
Hilbert E. Swanson
Charles B. Rasmussen
Atty.

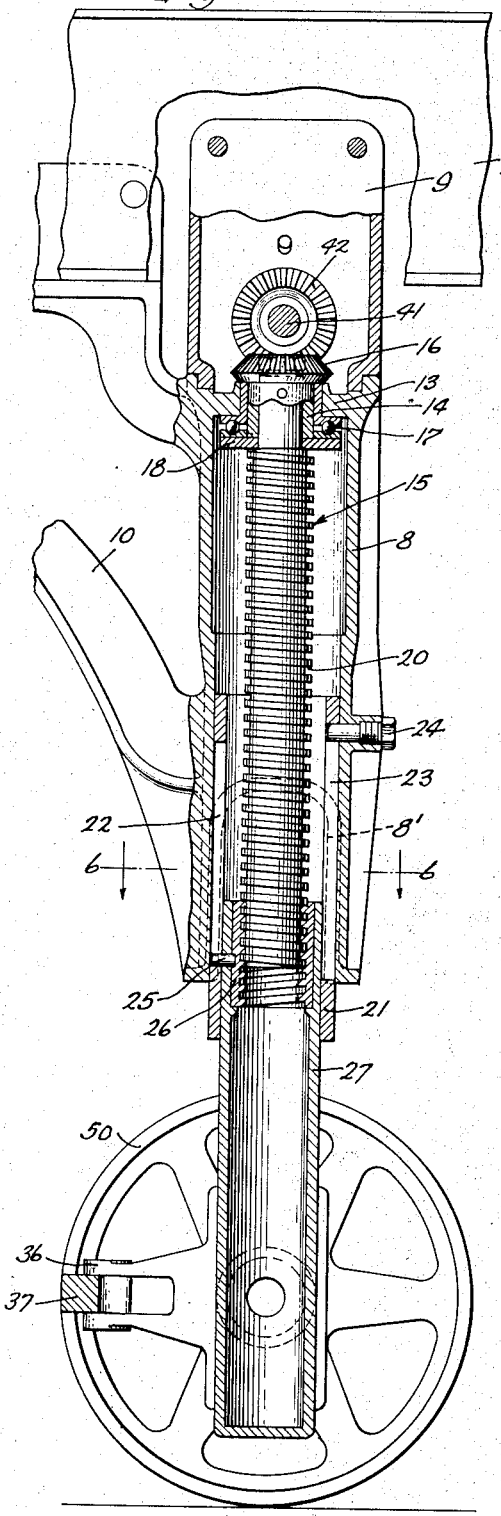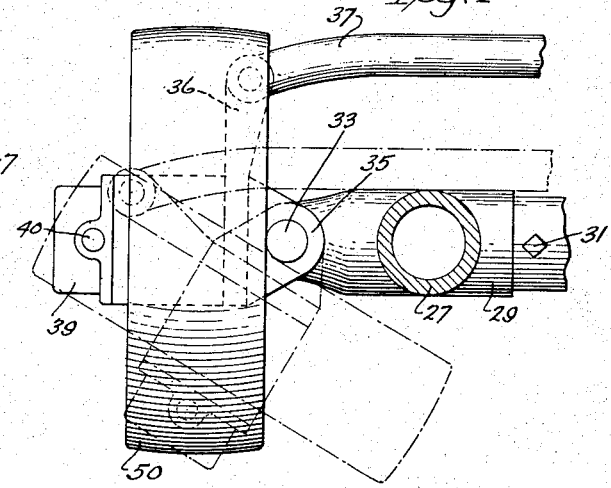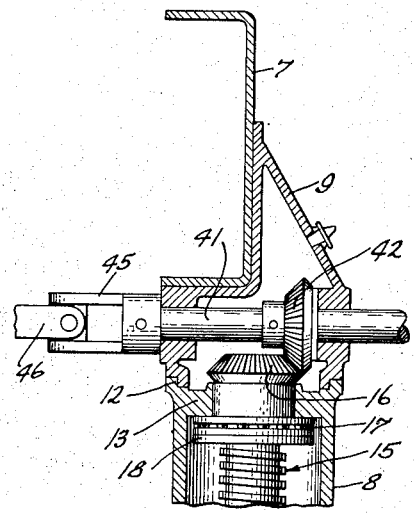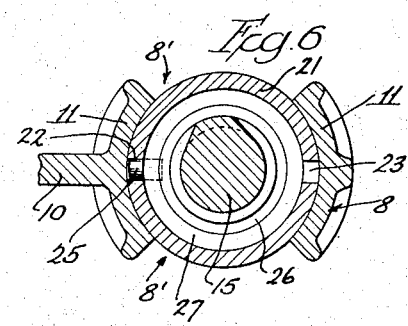

Patented June 1, 1937

2,082,033

UNITED STATES PATENT OFFICE 2,082,033

LANDING GEAR

Carl G. Seyferth and Hilbert E. Swanson, Muskegon, Mich., assignors to West Michigan Steel Foundry Co., Muskegon, Mich., a corporation of Michigan Application May 21, 1934, Serial No. 726,724

5 Claims. (Cl. 280—33.1)

This invention relates to landing gears and has more particular reference to retractable landing gears for trailers.

A principal object of the invention is the provision of a landing gear for trailer vehicles, which may readily be raised to inoperative position when the trailer has been coupled to the tractor vehicle and is supported thereon, and which also can readily be lowered to support the trailer vehicle independently of the tractor vehicle.

A further object of the invention is the provision of a landing gear in which the operations of raising and lowering the trailer gear may be carried out from the side of the trailer to eliminate the necessity of working in front of or below the trailer.

A further important object of the invention is the provision of a landing gear in which the supporting wheels are positively maintained in operative position in which they carry the load of the trailer when the latter has been detached from the tractor vehicle, and in which these wheels may easily be raised again to inoperative position out of contact with the ground.

Another important object of the invention is the provision of a structure of this kind wherein the supporting wheels of the trailer are interconnected to permit simultaneous adjustment of these wheels to variable positions when required.

Another important object of the invention is the provision of means for facilitating uniform raising and lowering of the supporting wheels of the trailer by connecting the lifting mechanism for the landing gear structure with an operative shaft through universal joints.

Numerous other objects and advantages of the invention will be apparent as it is better understood from the following description, which, when taken in connection with the accompanying drawings, discloses a preferred embodiment thereof.

On the drawings,

Fig. 3 is a sectional view, partly in elevation, of the wheel raising and lowering mechanism, shown on a larger scale;

Fig. 4 is a fragmentary plan view, partly in section, of the swivel attachment of a supporting wheel to the frame of the landing gear;

Fig. 5 is a sectional view of a portion of the actuating means for the raising and lowering mechanism; and Fig. 6 is a horizontal sectional view of the mechanism taken substantially on the line 6—6 of Fig. 3.

Figure 1:
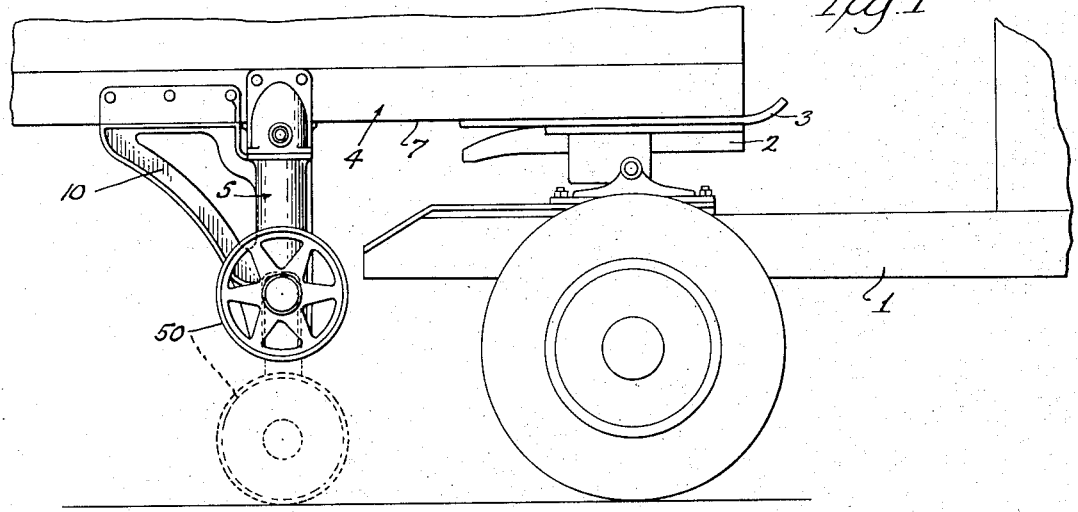
Figure 1 is a fragmentary side elevation of portions of a truck and trailer, with the landing gear in inoperative position.

The tractor vehicle, indicated by reference character 1, is provided with coupling means in the form of a suitably supported tractor plate 2 with which a skid 3 on the trailer vehicle 4 may be connected in any suitable manner, the details of which being of no importance for the present invention.

The trailer 4 is provided with a landing gear assembly comprising fixed supporting structures 5 and a movable wheel carrying portion, indicated generally at 6, said wheel carrying portion being adapted to be raised and lowered in respect of the fixed supporting structures to assume the position shown in full lines in Fig. 1 when the trailer is coupled to the tractor, and to assume the position shown in dotted lines in Fig. 1 when the trailer is to be supported by its own wheels.

The fixed frames are secured to longitudinal sills 7 forming a part of the trailer 1. Each frame comprises a housing 8 and a hollow bracket or head 9, the latter being secured by flanges to the longitudinal sills 7. The housings 8 which are of general tubular construction extend from the heads 9 downward parallel to each other, each of these housings being provided with a strong bracing bracket 10 substantially triangular in form, the upper bar of which being attached to the sills 7 of the trailer vehicle (see Fig. 1).

Figure 2:
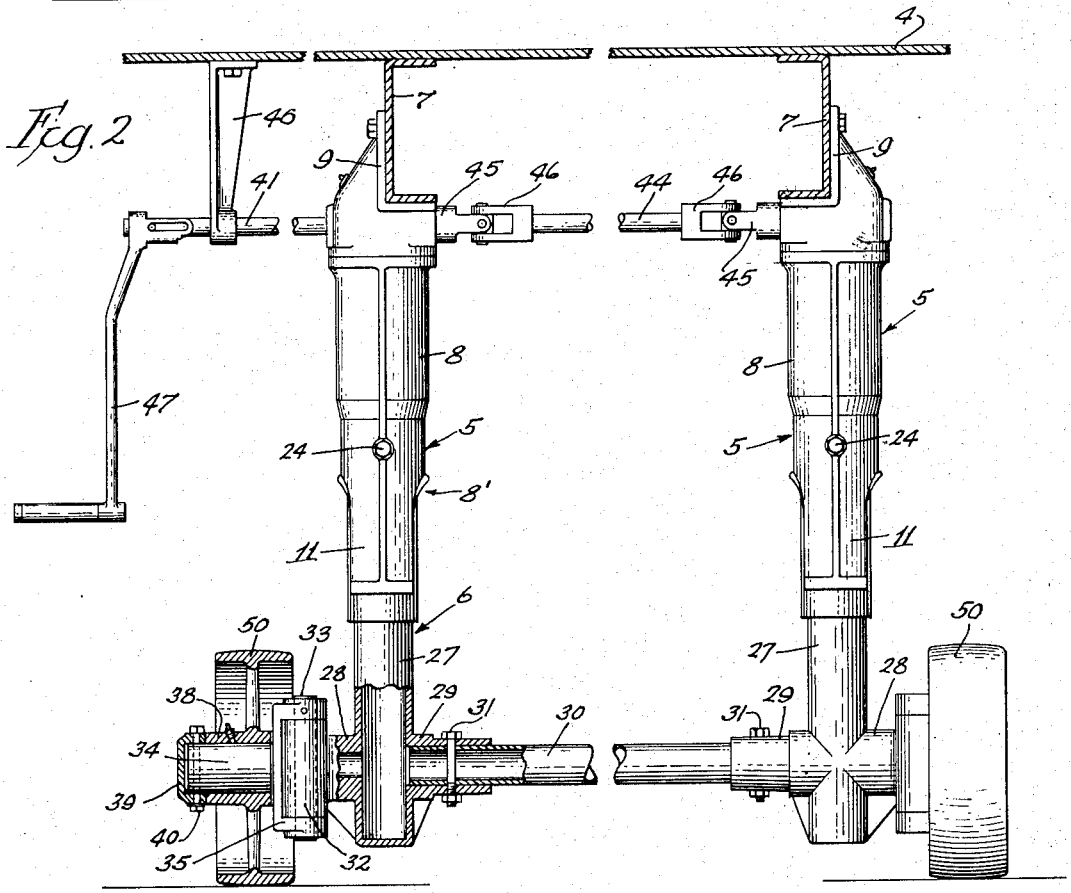
Fig. 2 is a sectional view and part front elevation of the trailer frame and landing gear.

As shown in Figs. 2 and 6, the housings 8 are provided adjacent their lower ends with opposite cut-out portions 8' leaving above the lower ends of the housings the front and rear guide walls 11, which may be reinforced by ribs, as illustrated. The housings 8 are open at their lower ends, but are provided at their top with shoulders 12 against which correspondingly finished surface portions of the heads 9 are seated, and they are closed by a top wall 13 (Fig. 5), having a central opening for the reception of the bearing bushing 14 in turn adapted to receive the bearing of a screw 15 which extends longitudinally through the length of the housing 8. The bearing portion of the screw carries fixedly at its projecting end a bevel gear 16, the hub of which may be integral with the bushing 14.

A ball thrust bearing 17 is interposed between the wall 13 of the housing and a retaining washer 18 supported on the screw 15, permitting rotation of the screw, while preventing axial movement of the same in either direction. The screw 15 is provided with a screw thread 20 over its entire length.

Viewing Fig. 3, it will be noted that the upper portion of the housing 8 may be cored out while the lower portion of the housing, including the part 11, is finished to furnish a tubular guide for a sleeve 21. This sleeve is provided with two longitudinally extending slots 22 and 23, preferably diametrically opposite each other. These slots, it will be noted, are disposed within the part 11 thereby preventing any entrance of dirt or other undesirable matter. Rotation of the sleeve 21 relatively to the housing 8 is prevented by means of a threaded pin 24 extending through a boss of the housing into the interior of the slot 23. A dowel holding pin 25 projects into the opposite slot 22 of the tubular sleeve 21 and is fixed in a nut 26 which is in engagement with the threaded portion 20 of the screw 15.

It will be apparent that the screw pin 24 locks the sleeve 21 against rotation about its axis, and since the dowel 25 connects the sleeve 21 with the nut 26, the nut 26 will be held against rotary movement so that upon rotation of screw 15 axial movement of this nut will be effected. This axial movement will be upward or downward depending upon the direction of rotation. It will also be noted from Fig. 3 that the screw pin 24 extending through the stationary housing 8 and into the slot 23 constitutes a means for limiting the axial movement of the tubular sleeve 21 either upward or downward.

The dowel 25, which constitutes a connecting member between the tubular sleeve 21 and the nut 26, also constitutes a connecting member between the nut 26 and the lower movable wheel carrying portion 6. This wheel carrier structure comprises a pair of tubular sleeves 27 having tubular transverse studs 28, 29 projecting adjacent their bottom ends, and a tubular transverse axle member 30 connected to the studs 29 of sleeves 27 by bolts 31. The studs 28 are provided with vertically disposed bearing members 32 which form bearing sleeves for swivel pins 33, rotatably supported therein.

A stub shaft 34 terminates in a bifurcated bracket 35, the prongs of which embrace the ends of the pivot pin 33 whereby the stub shaft 34 may be turned about the axis of the pivot pin 33 in any desired direction, as indicated in Fig. 4. The bracket 35 is provided with a laterally projecting fork 36 to the outer end of which a tie rod 37 is pivotally connected to effect simultaneous swinging movement of the wheels 50.

These wheels have hubs 38 which are loosely mounted on the stub shafts 34 and are held against axial displacement on said stub shafts by caps 39 positioned over the ends of said stub shafts and held in place by suitable pins 40. It will be apparent that the wheels 50 may swivel relatively to the wheel carrying structure, thereby rendering the entire trailer readily steerable when it has become detached from the tractor 1 and when the landing gear has been lowered to supporting relation in respect of the trailer.

It will be manifest that the openings 8', previously described, will allow the wheel carrying structure to be withdrawn (Fig. 1) until the studs 28 and 29 contact the upper extremities of the openings.

From the foregoing it will be apparent that the extension or retraction of the wheel carrier structure relatively to the stationary frame of the trailer will be effected by rotating the spindle 15. For the purpose of imparting simultaneous rotation to the spindles in both housings 8 to the same extent, the following means are provided: Shafts 41 are carried in each of the housings 9 which are directly secured to the longitudinal sills 7 of the trailer vehicle. Each of these shafts 41 is equipped in the interior of the head 9 with a bevel gear 42 which meshes with the bevel gear 16 of the spindle 15. Each of the shafts 41 is provided at the end which projects from the housing or head 9 towards the other housing or head, with a bifurcated portion constituting one element of a universal joint, indicated at 45. An intermediary shaft 44, carrying at both ends the companion members 46 for the universal joint, serves for connecting these ends of the shafts 41 to impart transmission to either of these shafts when the other one is being rotated and to permit either one of these shafts to be slightly offset angularly with respect to the other, without impeding the rotation of the spindle 15 associated with each of these shafts.

One of the shafts 41 extends outwardly beyond the housing or head 9 and is supported in a hanger bearing 46 secured to the frame of the vehicle. The free end of the shaft which projects from the bearing 46 is provided with means for receiving a hand crank 47 whereby rotation may be transmitted to the shaft 41 and from the latter through the intermediary shaft 44 to the companion shaft 41 in the other head casting.

When it is desired to release the trailer from the tractor, the operator positions the crank 47 on the projecting end of the shaft 41 and upon rotation of the crank the spindle 15 will be rotated through the bevel gears 42, 16, imparting axial movement to the nut 26 and sleeve 21. This nut is connected with the tubular sleeve 21 by means of the pin 25 and upon axial movement of the nut downward relatively to the spindle, the sleeve 21 also will be fed downward until the upper end of the slot 23 engages the stop pin 24.

The wheel carrier structure, comprising the tubular extensions 27, is also connected with the nut 26 through the pin 25 so as to be slidable relatively to the housing 8 without being rotatable thereto. The entire carrier structure will be lowered together with the wheels and after the wheels have come into engagement with the ground and have taken over the support of the trailer, the coupling connection between the trailer and the tractor may be released and the tractor may pull away from the trailer in the usual way. Similarly, upon desiring to connect the trailer with the tractor, the latter is advanced towards the trailer structure while the trailer is still supported on the wheels 50 and the coupling between the trailer and tractor is closed, whereupon the operator rotates the screws through a common crank raising the supporting wheels away from engagement with the ground and establishing the relation of the parts, as illustrated in Fig. 1.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A landing gear for trailers, comprising a pair of housings fixedly attached to the frame of the trailer and extending downward therefrom, a screw spindle rotatably secured in said housings and held against axial displacement therein, a nut in each housing in engagement with said screw spindle, a sleeve slidably guided in each of said housings, a second sleeve mounted for sliding movement only within each of said first sleeves and fixedly connected with said nut, wheels supported by said last named sleeves, and means accessible from the upper portion of the landing gear for rotating both of said screw spindles simultaneously.

2. A landing gear for trailers, comprising a pair of housings fixedly attached to the frame of the trailer and extending downwardly therefrom, a screw spindle rotatably mounted in each housing and held against axial displacement therein, a sleeve having a longitudinal slot slidable within each housing, means projecting through the wall of the housing and through the slot of the sleeve for preventing rotation of the sleeve relatively to the housing, a nut associated with each sleeve and adapted for axial sliding movement only relative thereto and in engagement with the screw spindle, other sleeves fixedly connected with each of said nuts, wheels rotatably mounted on said last named sleeves, and means accessible laterally of the gear from the top end of the housings for imparting rotation to both of the screw spindles simultaneously.

3. A landing gear for trailers, comprising a pair of housings fixedly secured to the frame of the trailer and extending downwardly therefrom, a screw spindle rotatably mounted in each housing and held against axial displacement therein, a sleeve slidably guided in each housing and held against rotary displacement therein, a nut in engagement with each screw spindle, another sleeve interposed between each of said first named sleeves and said nuts, means for connecting each of said two related sleeves and nuts, a wheel supported at the end of each of said second sleeves, and means accessible from the upper end of the housings for imparting rotation to said screw spindles simultaneously.

4. In a landing gear for trailers, a housing member fixedly secured to the frame of the trailer, a screw spindle rotatably mounted in said housing and held against axial displacement therein, a sleeve member mounted for axial movement within said housing, means cooperating with said sleeve and said housing for preventing relative rotational movement and limiting relative axial movement therebetween, a second sleeve member mounted for axial movement within said first sleeve, a nut in engagement with said spindle, and means cooperating with said nut and both of said sleeves for rigidly connecting said second sleeve and said nut and for preventing relative rotational movement and limiting relative axial movement between said sleeve members.

5. A retractable landing gear for trailers, comprising a pair of housings fixedly attached to the frame of the trailer and extending downward therefrom, a screw spindle rotatably secured in said housings and held against axial displacement therein, a nut in each housing in engagement with said screw spindle, a sleeve slidably guided in each of said housings, a second sleeve mounted for sliding movement only within each of said first sleeves and fixedly connected with a said nut, and wheel supporting means secured to said last named sleeves and interconnected with each other, said housings being provided with upwardly extending opposed recesses in the lower ends thereof to receive said wheel supporting means in retracted position.

CARL G. SEYFERTH.
HILBERT E. SWANSON.